US012404797B2

(12) United States Patent
Lang et al.

(10) Patent No.: US 12,404,797 B2
(45) Date of Patent: Sep. 2, 2025

(54) EXHAUST GAS CONTROL VALVE

(71) Applicant: BorgWarner Inc., Auburn Hills, MI (US)

(72) Inventors: Benjamin Norman Lang, Swartz Creek, MI (US); Timothy Patrick Heslip, Clarkston, MI (US); Ian Anton Bartusch, Waterford, MI (US)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 18/403,185

(22) Filed: Jan. 3, 2024

(65) Prior Publication Data

US 2024/0218820 A1 Jul. 4, 2024

(51) Int. Cl.
*F01N 13/08* (2010.01)
*F02D 39/00* (2006.01)

(52) U.S. Cl.
CPC .......... *F01N 13/087* (2013.01); *F02D 39/00* (2013.01)

(58) Field of Classification Search
CPC .. F16K 31/528; F16K 31/53; F16K 31/52408; F02M 26/67; F02M 26/54; F16H 19/001; F16H 25/14
See application file for complete search history.

(56) References Cited

U.S. PATENT DOCUMENTS 8,803,388 B2 8/2014 Keefover et al.
9,587,592 B2 * 3/2017 Keefover ................ F16K 31/53
10,161,527 B2 12/2018 Simons et al.
10,180,181 B2 * 1/2019 Cao ......................... F02M 26/54
10,619,604 B2 * 4/2020 Weis ........................ F16H 53/06
2002/0134441 A1 * 9/2002 Kusumoto .............. F16K 51/02 137/625.3

FOREIGN PATENT DOCUMENTS

EP 2959151 B1 8/2021
JP 2011247398 A 12/2011

OTHER PUBLICATIONS

English language abstract for EP 2 959 151 B1 extracted from espacenet.com database on Sep. 16, 2024, 2 pages.
English language abstract and machine-assisted English translation for JP 2011-247398 A extracted from espacenet.com database on Sep. 16, 2024, 28 pages.

* cited by examiner

*Primary Examiner* — Anthony Ayala Delgado
(74) *Attorney, Agent, or Firm* — Howard & Howard Attorneys PLLC

(57) ABSTRACT

An exhaust gas control valve includes a housing having an interior wall defining a housing interior, a pinion gear coupled to the housing and configured to be rotatably driven, and a helical gear configured to receive torque from the pinion gear and including a plurality of helically arranged teeth. The exhaust gas control valve also includes a valve member disposed at least partially in the housing interior of the housing. The valve member includes a valve shaft extending along an axis and having first and second shaft ends, and a valve body coupled to the valve shaft adjacent to the second shaft end and moveable with the valve shaft along the axis between a first valve position and a second valve position. The exhaust gas control valve further includes a motion converter configured to convert rotational motion of the helical gear to linear motion of the valve member.

20 Claims, 7 Drawing Sheets

EXHAUST GAS CONTROL VALVE

CROSS-REFERENCE TO RELATED APPLICATIONS

The present application claims priority to and all the benefits of U.S. Provisional Patent Application No. 63/437,011, filed on Jan. 4, 2023, which is hereby expressly incorporated herein by reference in its entirety.

BACKGROUND OF THE INVENTION

1. Field of the Invention

The invention generally relates to an exhaust gas control valve.

2. Description of the Related Art

Conventional exhaust gas control valves are used to regulate a flow of exhaust gas produced from an internal combustion engine. Exhaust gas control valves are used in various applications and can be employed as an exhaust gas recirculation (EGR) valve, a bypass valve, an exhaust tuning valve, and the like.

Typical exhaust gas control valves include a valve member having a valve shaft and a valve body, with the valve member moveable along an axis between an open position and a closed position to regulate the flow of exhaust gas. The valve member is commonly moved through actuation of a gear arrangement. The gear arrangements known in the art often impart a torque multiplication from an actuator to the valve member to assist in overcoming a force exerted on the valve member by the exhaust gas. However, to impart the torque multiplication between the actuator and the valve member necessary to overcome the force of the exhaust gas, particularly on the valve body of the valve member, the gear arrangements known in the art are space consuming, formed of costly materials, or both. As forces exerted by exhaust gas on the valve member, particularly the valve body, continue to increase because of larger valve body requirements to permit higher flow of exhaust gas, higher torque multiplications between the actuator and the valve member are required.

As such, there remains a need to provide an improved exhaust gas control valve.

SUMMARY OF THE INVENTION AND ADVANTAGES

An exhaust gas control valve for regulating a flow of exhaust gas is provided. The exhaust gas control valve includes a housing having an interior wall defining a housing interior, a pinion gear coupled to the housing and configured to be rotatably driven, and a helical gear configured to receive torque from the pinion gear. The helical gear includes a plurality of helically arranged teeth. The exhaust gas control valve also includes a valve member disposed at least partially in the housing interior of the housing. The valve member includes a valve shaft extending along an axis and having a first shaft end and a second shaft end spaced from the first shaft end along the axis. The valve member also includes a valve body coupled to the valve shaft adjacent to the second shaft end. The valve body is moveable with the valve shaft along the axis between a first valve position of the valve member and a second valve position of the valve member to regulate the flow of exhaust gas. The exhaust gas control valve further includes a motion converter configured to convert rotational motion of the helical gear to linear motion of the valve member.

The helical gear improves a contact ratio between the helical gear and an adjacent gear to increase the amount of torque able to be transmitted. Thus, the helical gear permits a higher relative torque multiplication to assist in overcoming a force exerted on the valve member, particularly the valve body, by the exhaust gas without the need for other space consuming components (e.g. a larger gear), costly materials, or both.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
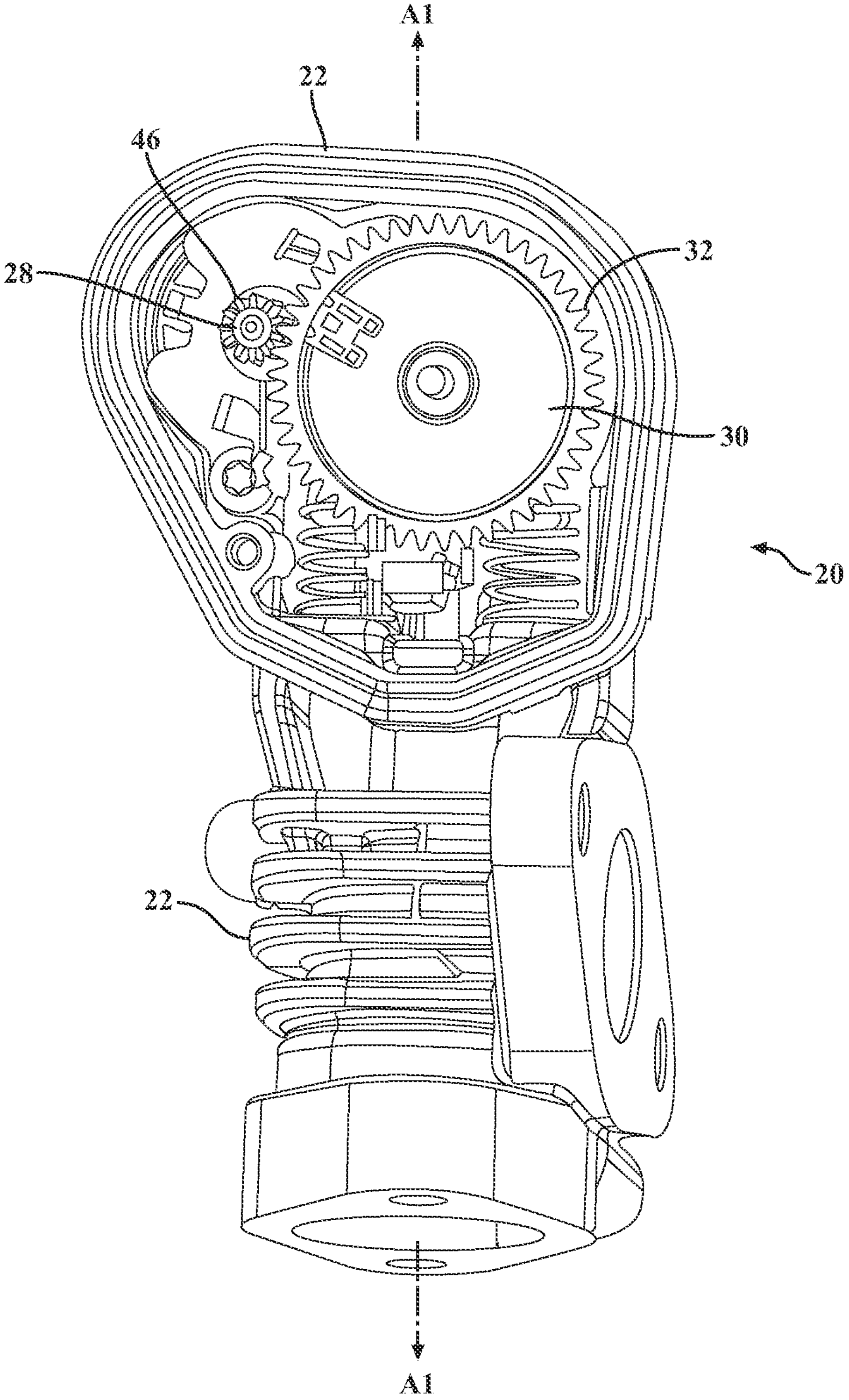
FIG. 1 is a perspective view of an exhaust gas control valve including a housing, a helical gear, and a pinion gear.
Figure 2:
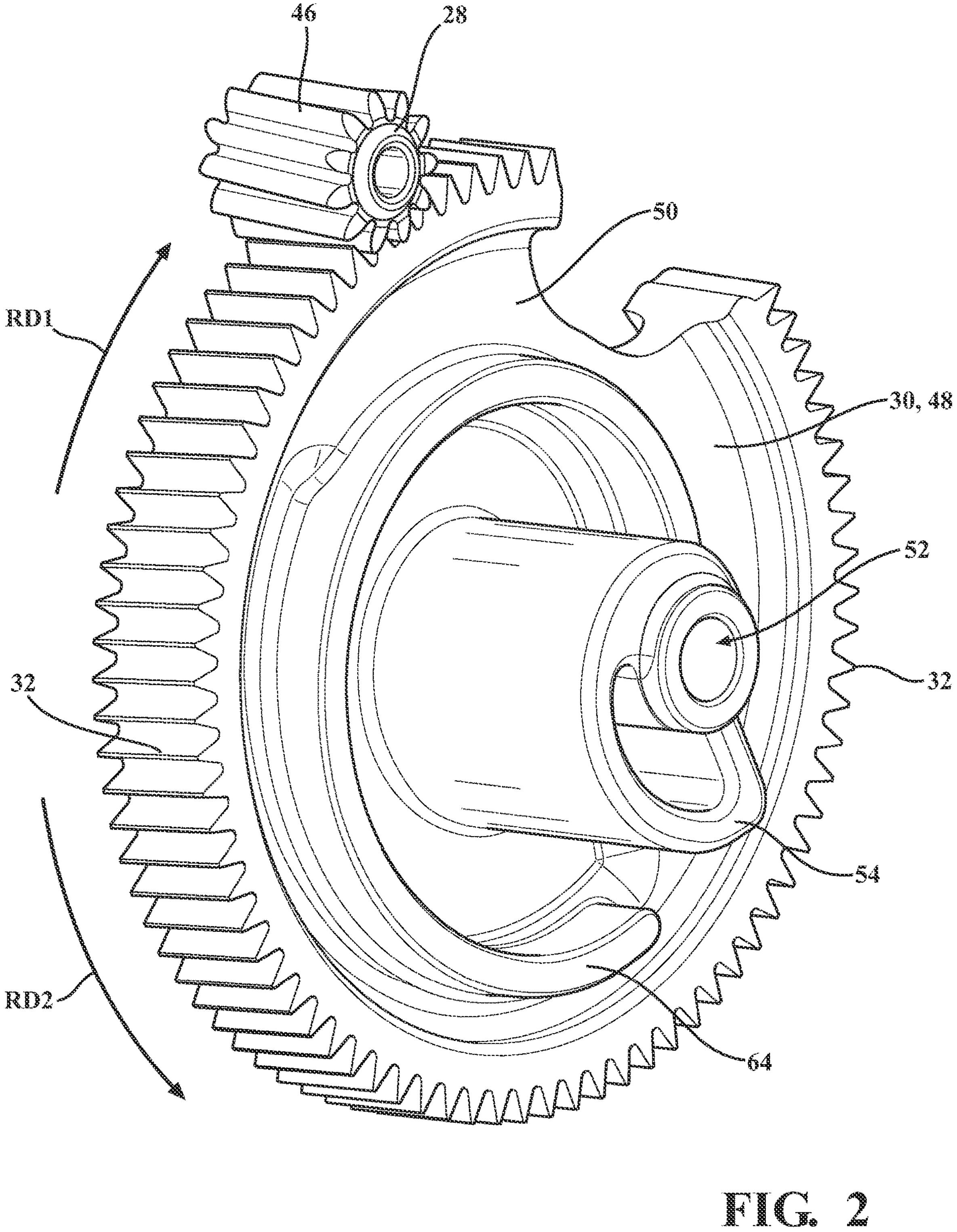
FIG. 2 is a perspective view of the helical gear and the pinion gear in meshed arrangement.
Figure 3:
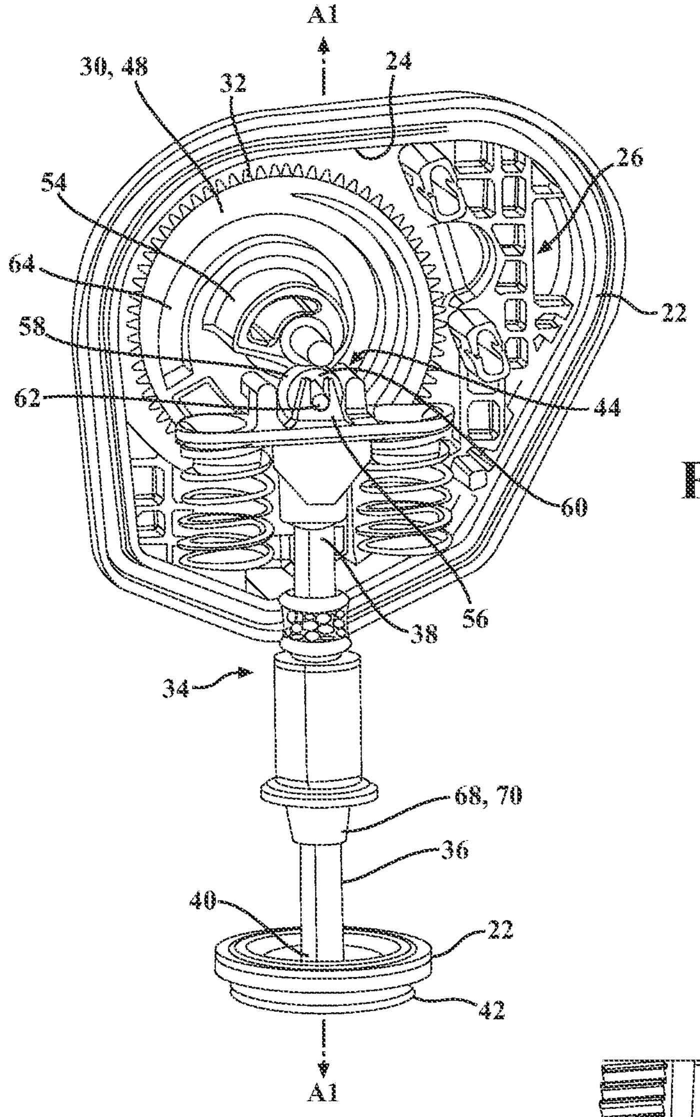
FIG. 3 is a perspective view of the exhaust gas control valve, with the exhaust gas control valve also including a valve member having a valve shaft and a valve body, and a motion converter.
Figure 4:
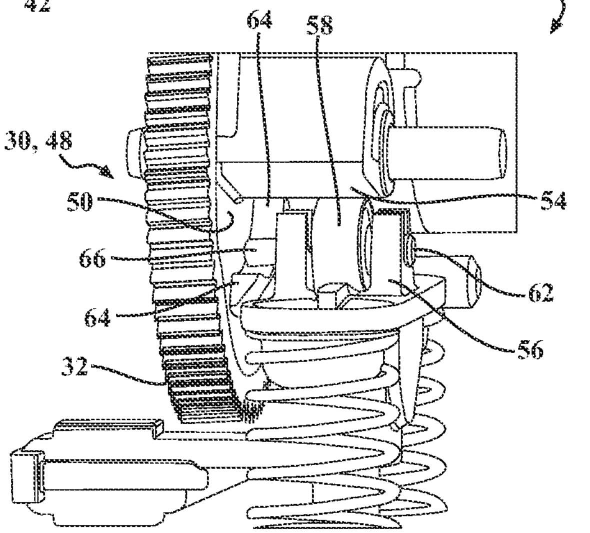
FIG. 4 is a side perspective view of the motion converter of FIG. 3.
Figure 7:
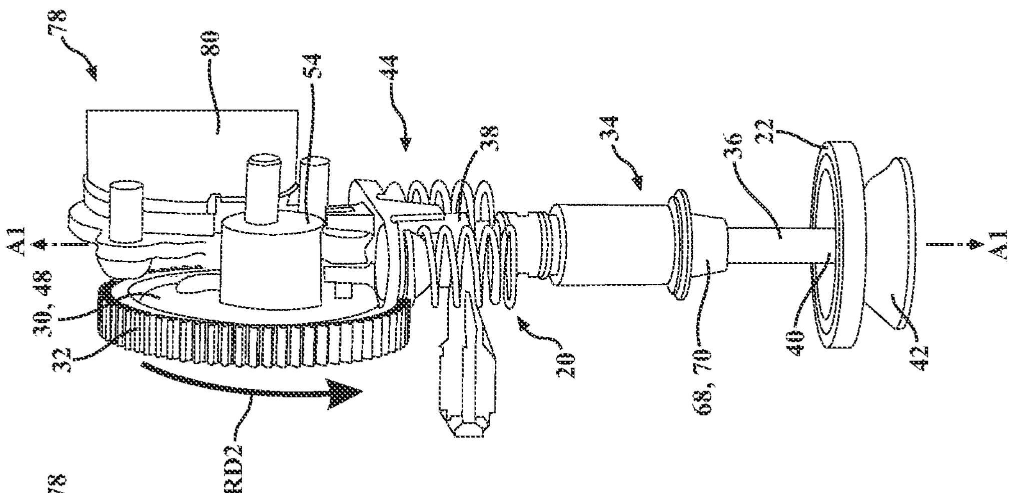
FIG. 7 is a side perspective view of the exhaust gas control valve in one of several progressive states of being moved from the second valve position to the first valve position.

With reference to the Figures, wherein like numerals indicate like parts throughout the several views, an exhaust gas control valve 20 for regulating a flow of exhaust gas is shown in FIGS. 1-10. The exhaust gas control valve 20 includes a housing 22 having an interior wall 24 defining a housing interior 26, a pinion gear 28 coupled to the housing 22 and configured to be rotatably driven, and a helical gear 30 configured to receive torque from the pinion gear 28. The helical gear 30 includes a plurality of helically arranged teeth 32. The exhaust gas control valve 20 also includes a valve member 34 disposed at least partially in the housing interior 26 of the housing 22. The valve member 34 of the exhaust gas control valve 20 may be a poppet valve, as shown in FIGS. 3 and 5-10.

Figure 6:
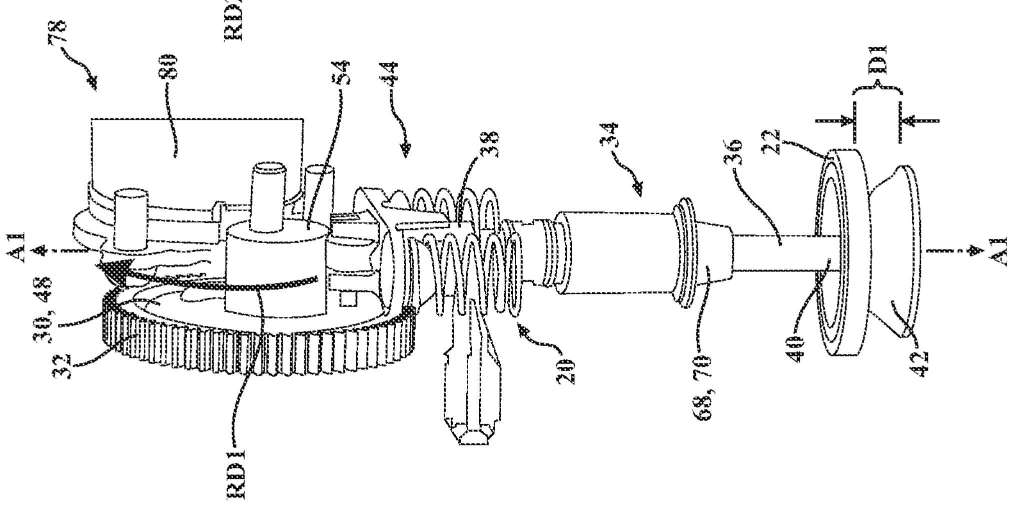
FIG. 6 is a side perspective view of the exhaust gas control valve in a second valve position.
Figure 5:
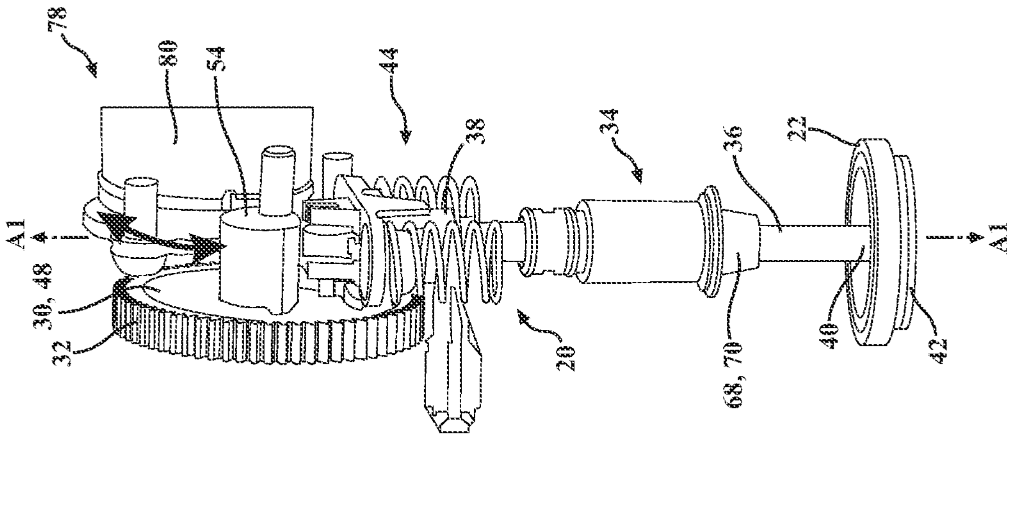
FIG. 5 is a side perspective view of the exhaust gas control valve in a first valve position.
Figure 9:
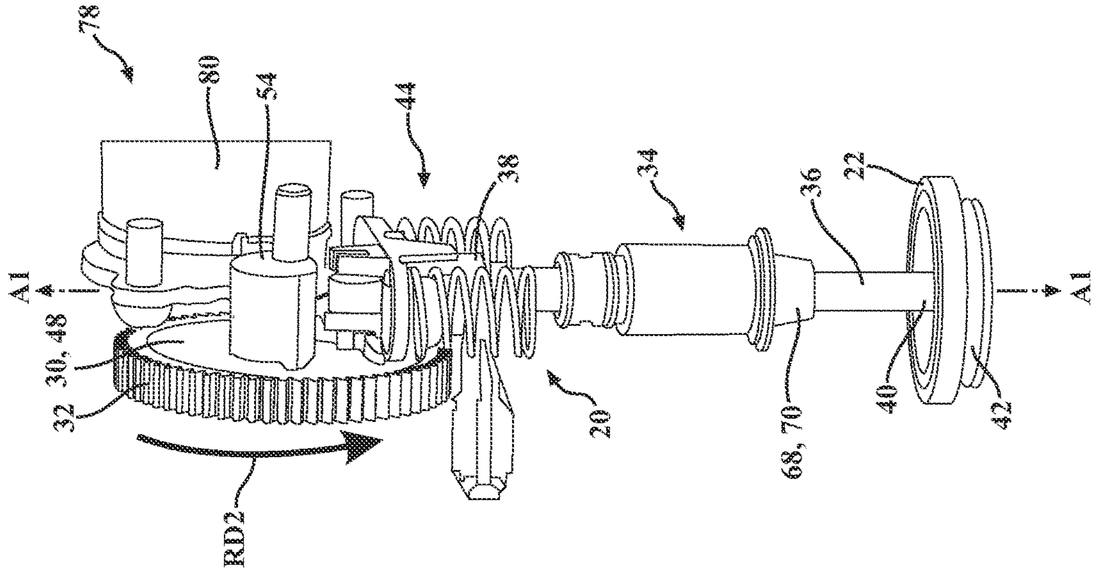
FIG. 9 is a side perspective view of the exhaust gas control valve in one of several progressive states of being moved from the second valve position to the first valve position.
Figure 8:
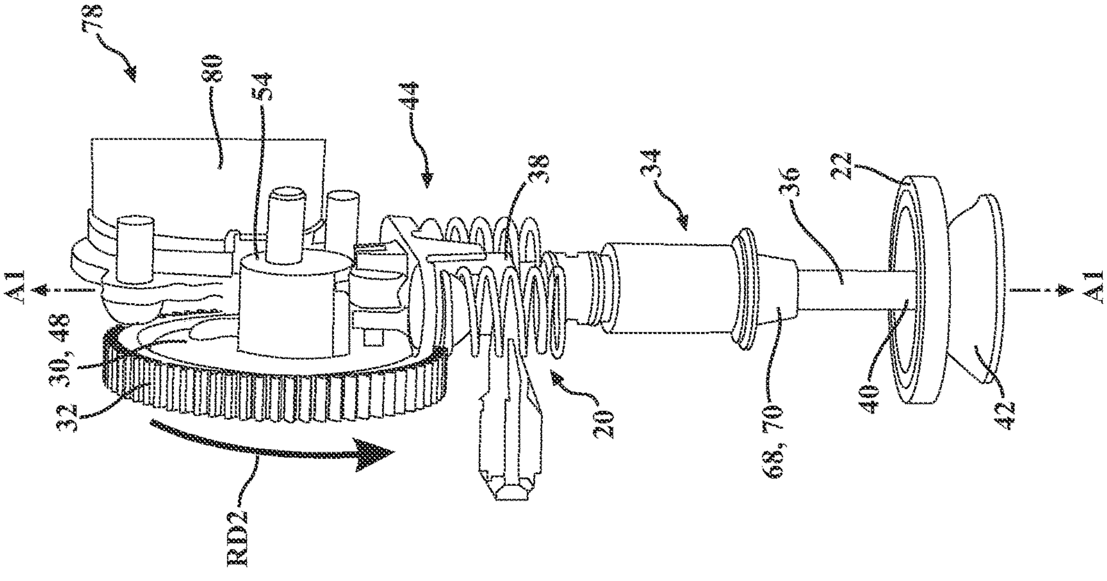
FIG. 8 is a side perspective view of the exhaust gas control valve in one of several progressive states of being moved from the second valve position to the first valve position.

The valve member 34 includes a valve shaft 36 extending along an axis A1 and having a first shaft end 38 and a second shaft end 40 spaced from the first shaft end 38 along the axis A1. The valve member 34 also includes a valve body 42 coupled to the valve shaft 36 adjacent to the second shaft end 40. The valve body 42 is moveable with the valve shaft 36 along the axis A1 between a first valve position of the valve member 34, as shown in FIG. 5, and a second valve position of the valve member 34, as shown in FIG. 6, to regulate the flow of exhaust gas. The first valve position may be closed, and the second valve position may be open. The exhaust gas control valve 20 further includes a motion converter 44 configured to convert rotational motion of the helical gear 30 to linear motion of the valve member 34. It is to be appreciated that linear motion of the valve member 34 is generally along the axis A1.

The helical gear 30 improves a contact ratio between the helical gear 30 and an adjacent gear as compared to conventional gears to increase the amount of torque able to be transmitted. Thus, the helical gear 30 permits a greater relative torque multiplication as compared to conventional gears to assist in overcoming a force exerted on the valve member 34, particularly the valve body 42, by the exhaust gas without the need for other space consuming components (e.g., a larger gear), costly materials, or both. In some embodiments, the helical gear 30 generates about a 72% increase in lift force of the valve member 34 in the first valve position against the flow of exhaust gas as compared to another similarly sized gear. Therefore, a larger valve body 42 may be provided and a higher flow rate of exhaust gas is achievable. It is to be appreciated that the force exerted on the valve member 34, particularly the valve body 42, by the exhaust gas may result from a pressure differential on either side of the valve body 42, particularly when the valve member 34 is at or near the first valve position (i.e., closed).

Although not required, the pinion gear 28 may also include a plurality of helically arranged teeth 46. For descriptive purposes, the plurality of helically arranged teeth 46 of the pinion gear 28 is referred to throughout as a second plurality of helically arranged teeth 46. The pinion gear 28 and the helical gear 30 may be in meshed engagement. In other words, the pinion gear 28 and the helical gear 30 may be in direct contact with one another. More specifically, the plurality of helically arranged teeth 32 of the helical gear 30 and the second plurality of helically arranged teeth 46 of the pinion gear 28 may be in meshed engagement with one another. Thus, the pinion gear 28 and the helical gear 30 may form a single stage geartrain. However, it is to be appreciated that torque may be transmitted from the pinion gear 28 to the helical gear 30 through any number of intermediate gear(s). In the embodiments with intermediate gear(s), it is to be appreciated that the helical gear 30 is still configured to receive torque from the pinion gear 28. The plurality of helically arranged teeth 32 of the helical gear 30 and the second plurality of helically arranged teeth 46 of the pinion gear 28 reduce stress and wear on the plurality of helically arranged teeth 32 and the second plurality of helically arranged teeth 46, thus prolonging the life of the exhaust gas control valve 20. Moreover, reduced stress on the plurality of helically arranged teeth 32 permits a relatively smaller center distance of the helical gear 30 and a relatively smaller outer diameter of the helical gear 30, further reducing the packaging space of the exhaust gas control valve 20.

One of the plurality of helically arranged teeth 32 of the helical gear 30 and the second plurality of helically arranged teeth 46 of the pinion gear 28 may have a right-handed helical configuration, and the other one of the plurality of helically arranged teeth 32 of the helical gear 30 and the second plurality of helically arranged teeth 46 of the pinion gear 28 has a left-handed helical configuration. In other words, in one embodiment, the plurality of helically arranged teeth 32 of the helical gear 30 has a right-handed helical configuration, and the second plurality of helically arranged teeth 46 of the pinion gear 28 has a left-handed helical configuration, and in another embodiment, the plurality of helically arranged teeth 32 of the helical gear 30 has a left-handed helical configuration and the second plurality of helically arranged teeth 46 of the pinion gear 28 has a right-handed helical configuration.

The plurality of helically arranged teeth 32 of the helical gear 30 may have a helix angle of about 1 degree to about 10 degrees. It is also to be appreciated that the plurality of helically arranged teeth 32 of the helical gear 30 may have a helix angle of about 2 degrees to about 9 degrees, of about 3 degrees to about 7 degrees, of about 4 degrees to about 6 degrees, of about 1 degree to about 9 degrees, of about 1 degree to about 8 degrees, of about 1 degree to about 7 degrees, of about 1 degree to about 6 degrees, of about 1 degree to about 5 degrees, of about 1 degree to about 4 degrees, of about 1 degree to about 3 degrees, of about 1 degree to about 2 degrees, of about 1 degree, of about 2 degrees, of about 3 degrees, of about 4 degrees, of about 5 degrees, of about 6 degrees, of about 7 degrees, of about 8 degrees, of about 9 degrees, and of about 10 degrees. However, it is also to be appreciated that the plurality of helically arranged teeth 32 of the helical gear 30 may even have a helix angle of more than 10 degrees, or ranging to more than 10 degrees, such as about 1 degree to about 15 degrees, about 1 degree to about 14 degrees, about 1 degree to about 13 degrees, about 1 degree to about 12 degrees, and about 1 degree to about 11 degrees.

A helix angle of about 1 degree to about 10 degrees is relatively small among helical gears known in the art. The helix angle may be limited to about 1 degree to about 10 degrees to obtain the benefits associated with an improved contact ratio (e.g. higher torque resulting from a higher gear ratio) without generating thrust loads which may damage other components of the exhaust gas control valve 20, including the helical gear 30 itself and/or the pinion gear 28. High thrust loads may negate the benefits associated with the improved contact ratio. The helix angle being limited to about 1 degree to about 10 degrees permits the use of the helical gear 30 in the exhaust gas control valve 20 where otherwise a helical gear with a large helix angle would be considered inappropriate and/or unfeasible.

Although not required, a gear ratio between the pinion gear 28 and the helical gear may be at least 6:1. Moreover, the gear ratio between the pinion gear 28 and the helical gear 30 may be at least 7:1, may be at least 8:1, may be at least 9:1, or may be at least 10:1. The gear ratio between the pinion gear 28 and the helical gear 30 may also be at least 4:1, at least 5:1, or may be between about 5:1 and about 10:1, may be between about 5:1 and about 8:1, may be between about 6:1 and about 8:1, and may be between about 6:1 and about 7:1.

The helical gear 30 may be further defined as a helical cam gear 48 having a helical cam gear surface 50 defining a central opening 52 therethrough. The helical cam gear 48 may also have a cam feature 54 extending away from the helical cam gear surface 50. The cam feature 54 may be disposed about the central opening 52. The helical cam gear 48 may be rotatable in either a first rotational direction RD1 or a second rotational direction RD2 opposite the first rotational direction RD1. The motion converter 44 may include a link 56 coupled to the first shaft end 38 of the valve shaft 36, and the motion converter 44 may include a bearing 58 rotatably supported by the link 56. The bearing 58 may be engageable with the cam feature 54 of the helical cam gear 48 to move the valve member 34 toward the second valve position as the helical cam gear 48 rotates in the first rotational direction RD1. It is to be appreciated that rotation of the helical cam gear 48 in the first rotational direction RD1 may move the valve member toward the first valve position (e.g., closed) and that rotation of the helical cam gear 48 in the second rotational direction RD2 may move the valve member toward the second valve position (e.g. open). Moreover, the bearing 58 may define a bore 60, and the motion converter 44 may further include a bearing shaft 62 rotatably supported by the link 56. The bearing shaft 62 may be disposed in the bore 60 of the bearing 58.

The helical cam gear 48 may also have a return feature 64 extending away from the helical cam gear surface 50. The return feature 64 may extend about the central opening 52, and the return feature 64 may be spaced between the cam feature 54 and the plurality of helically arranged teeth 32. The bearing shaft 62 may include an extended portion 66 engageable with the return feature 64 of the helical cam gear 48 to move the valve member 34 toward the first valve position as the helical cam gear 48 rotates in the second rotational direction RD2.

The cam feature 54 of the helical cam gear 48 may be configured to provide a non-linear cam ramp rate. The valve member 34 may be configured to move a distance D1 from the first valve position to the second valve position, and the cam feature 54 of the helical cam gear 48 may be configured to provide the non-linear cam ramp rate such that mechanical advantage is maximized when the valve member 34 is within about 0 percent to about 10 percent of the distance D1 from the first valve position. A non-linear cam ramp rate permits a smaller gear ratio to provide the same initial force when moving from the first valve position toward the second valve position against the flow of exhaust gas. It is to be appreciated that where the cam ramp rate is lower there is increased mechanical advantage, thus allowing the valve member 34 to have a targeted lift force increase. Moreover, a non-linear cam ramp rate increases force output of the valve member 34 when the valve member 34 is near the first valve position (e.g. within about 0 percent to about 10 percent of the distance D1 from the first valve position) when force output is most needed to successfully move to the valve member 34 to the second valve position.

The non-linear cam ramp rate may be characterized as the rate at which the relative distance between the cam feature 54 and the central opening 52 changes as the cam feature 54 rotates. As such, the non-linear camp ramp rate may be characterized in terms of millimeters per degree of rotation of the cam feature 54, or in terms of percentage change of the relative distance between the cam feature 54 and the central opening 52 per degree of rotation of the cam feature 54. It is to be appreciated that, under either characterization, the non-linear cam ramp rate is not constant throughout all possible degrees of rotation of the cam feature 54. It is also to be appreciated that the non-linear cam ramp rate may alternatively be characterized as a non-linear lift rate.

Figure 10:
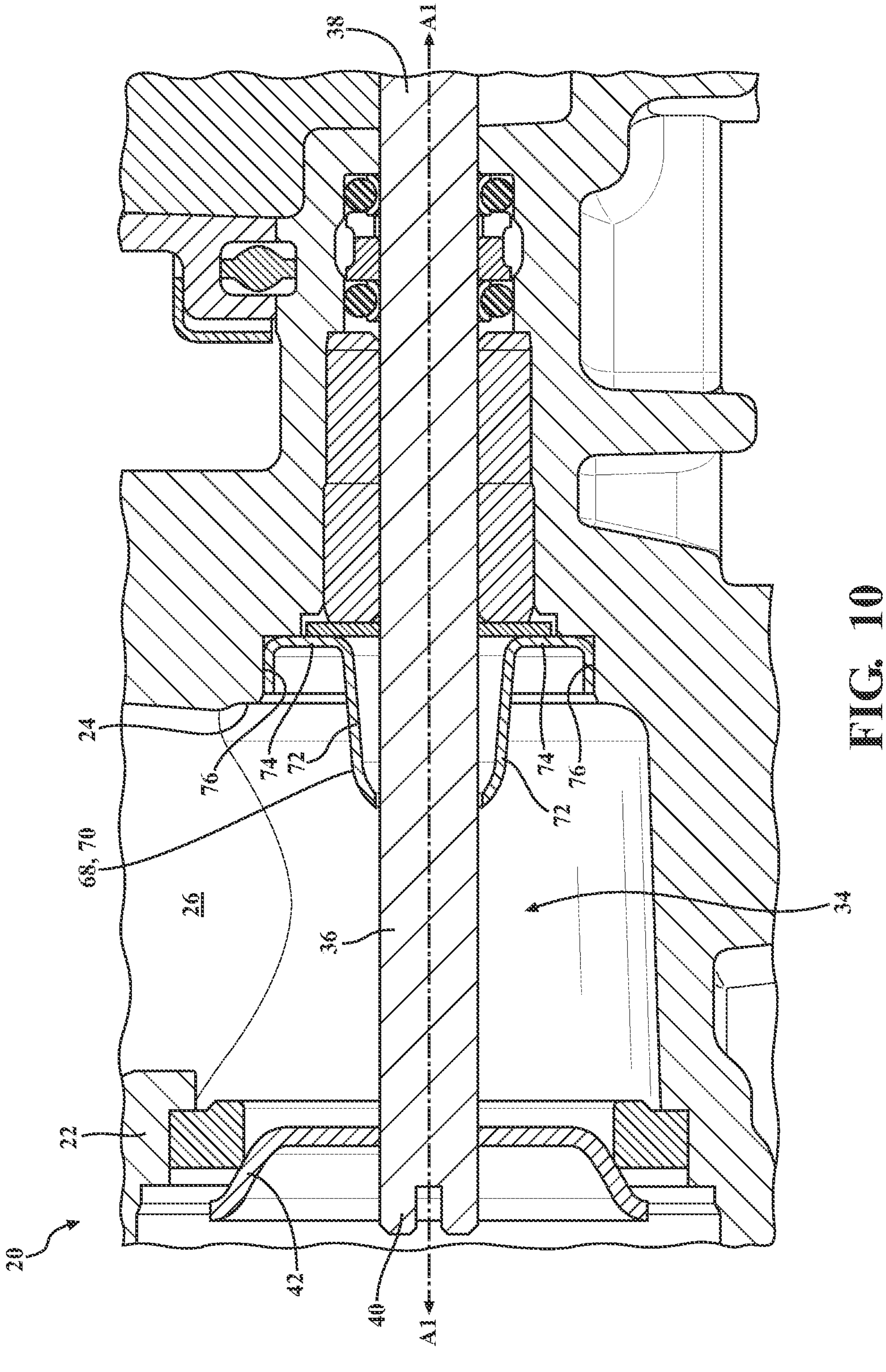
FIG. 10 is a cross-sectional view of the exhaust gas control valve, with the exhaust gas control valve including a resilient shaft shield configured to resiliently engage an interior wall of the housing to limit the flow of exhaust gas.
Figure 11:
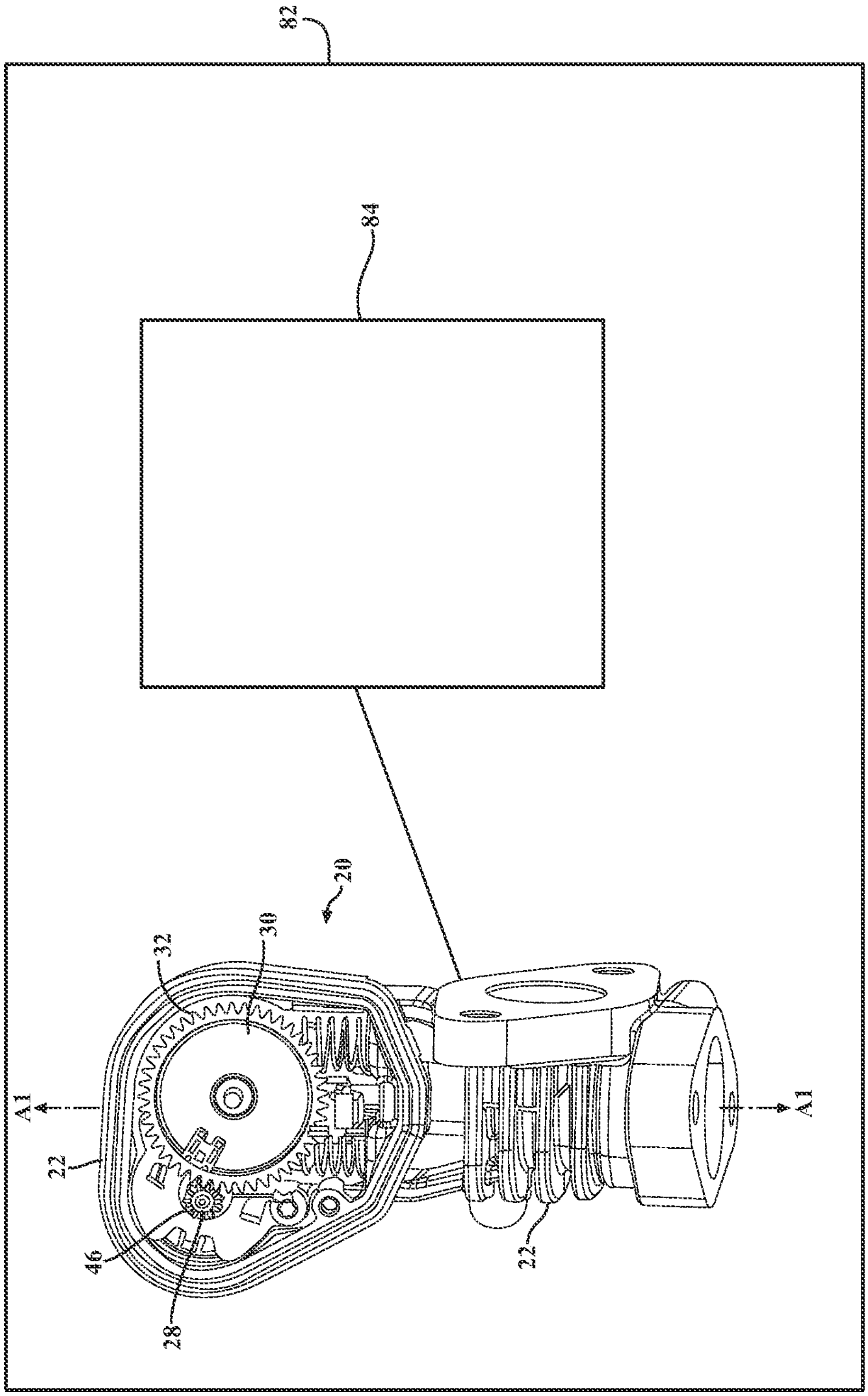
FIG. 11 is a schematic illustration of an assembly including an exhaust gas manifold and the exhaust gas control valve.

As shown in FIGS. 10, the exhaust gas control valve 20 may further include a shaft shield 68 disposed about the valve shaft 36. The shaft shield 68 may be further defined as a resilient shaft shield 70 configured to resiliently engage the interior wall 24 of the housing 22 to limit the flow of exhaust gas toward the first shaft end 38 of the valve shaft 36. It is to be appreciated that limiting the flow of exhaust gas toward the first shaft end 38 of the valve shaft 36 also limits flow of soot, debris, and other contamination which may be in, or suspended by, the exhaust gas toward the first shaft end 38 of the valve shaft 36. It is further to be appreciated that elastomeric seals may be provided near the valve shaft 38 to further prevent flow of exhaust gas toward the first shaft end 38 of the valve shaft 36. The resilient shaft shield 70 may include a first shield portion 72 proximal to the second shaft end 40 of the valve shaft 36, and the first shield portion 72 of the resilient shaft shield 70 extends toward the first shaft end 38 of the valve shaft 36. The resilient shaft shield 70 may also include a second shield portion 74 extending from the first shield portion 72 away from the valve shaft 36, and the resilient shaft shield 70 may further include a third shield portion 76 extending from the second shield portion 74 toward the second shaft end 40 of the valve shaft 36. As shown in FIG. 10, the first shield portion 72, the second shield portion 74, and the third shield portion 76 of the resilient shaft shield 70 may generally have a U-shaped configuration.

The resilient shaft shield 70 protects the valve shaft 36 from contact with the soot, debris, and other contamination in, or suspended by, the exhaust gas which may cause the valve member 34 to move more slowly between the first valve position and the second valve position or which may cause the valve member 34 to become completely stuck. The resilient shaft shield 70 requires no staking or other mechanical fastening to be retained in position relative to the housing 22. Instead, the resilient shaft shield 70 engages the interior wall 24 of the housing 22 through a spring-lock, similar to a sealing push-in cap or a cup plug. Moreover, the resilient shaft shield 70 provides a dependable seal completely circumferentially about the valve shaft 36, and thus does not rely upon discrete points of staking or other mechanical fastening which may leave gaps between discrete points. Gaps between discrete points of staking or other mechanical fastening permit exhaust gas, soot, debris, or other contamination to leak through and contact the valve shaft 36, which reduces the lifespan of the exhaust gas control valve 20 through corrosive effects. As such, the resilient shaft shield 70 prolongs the lifespan of the exhaust gas control valve 20 by reducing corrosion of various components protected by the resilient shaft shield 70. Moreover, the resilient shaft shield 70 requires less time to assemble as compared to shaft shields which rely upon staking or other mechanical fastening because a step of staking, or a step of fastening, is not required to engage the resilient shaft shield 70 to the interior wall 24 of the housing 22. Additionally, engagement of the resilient shaft shield 70 and the interior wall 24 of the housing 22 is easily monitored during manufacturing to ensure a quality of the seal formed therebetween.

An exhaust gas control assembly 78 is further provided. The exhaust gas control assembly 78 includes the exhaust gas control valve 20 and an actuator 80 coupled to the housing 22 of the exhaust gas control valve 20. The actuator 80 is configured to rotatably drive the pinion gear 28. An assembly 82 for controlling a flow of exhaust gas from an engine is also provided. The assembly 82 includes an exhaust gas manifold 84 adapted to be coupled to the engine, and the exhaust gas control valve 20. It is also to be appreciated that the assembly 82 may include the exhaust gas control assembly 78, which then incorporates the actuator 80.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. An exhaust gas control valve for regulating a flow of exhaust gas, said exhaust gas control valve comprising:

a housing having an interior wall defining a housing interior;

a pinion gear coupled to said housing and configured to be rotatably driven;

a helical gear configured to receive torque from said pinion gear, said helical gear including a plurality of helically arranged teeth;

a valve member disposed at least partially in said housing interior of said housing, said valve member comprising a valve shaft extending along an axis and having a first shaft end and a second shaft end spaced from said first shaft end along said axis, and a valve body coupled to said valve shaft adjacent to said second shaft end and moveable with said valve shaft along said axis between a first valve position of said valve member and a second valve position of said valve member to regulate the flow of exhaust gas; and a motion converter configured to convert rotational motion of said helical gear to linear motion of said valve member, wherein said helical gear is further defined as a helical cam gear having a helical cam gear surface defining a central opening therethrough and having a cam feature extending away from said helical cam gear surface and disposed about said central opening.

2. The exhaust gas control valve as set forth in claim 1, wherein said pinion gear includes a second plurality of helically arranged teeth.

3. The exhaust gas control valve as set forth in claim 2, wherein one of said plurality of helically arranged teeth of said helical gear and said second plurality of helically arranged teeth of said pinion gear has a right-handed helical configuration, and the other one of said plurality of helically arranged teeth of said helical gear and said second plurality of helically arranged teeth of said pinion gear has a left-handed helical configuration.

4. The exhaust gas control valve as set forth in claim 1, wherein said pinion gear and said helical gear are in meshed engagement.

5. The exhaust gas control valve as set forth in claim 1, wherein said plurality of helically arranged teeth of said helical gear have a helix angle of 1 degree to 10 degrees.

6. The exhaust gas control valve as set forth in claim 1, wherein said plurality of helically arranged teeth of said helical gear have a helix angle of 3 degrees to 7 degrees.

7. The exhaust gas control valve as set forth in claim 1, wherein said plurality of helically arranged teeth of said helical gear have a helix angle of 4 degrees to 6 degrees.

8. The exhaust gas control valve as set forth in claim 1, wherein a gear ratio between said pinion gear and said helical gear is at least 6:1.

9. The exhaust gas control valve as set forth in claim 1, wherein a gear ratio between said pinion gear and said helical gear is at least 7:1.

10. The exhaust gas control valve as set forth in claim 1, wherein said valve member is a poppet valve.

11. The exhaust gas control valve as set forth in claim 1 further comprising a shaft shield disposed about said valve shaft, wherein said shaft shield is further defined as a resilient shaft shield configured to resiliently engage said interior wall of said housing to limit the flow of exhaust gas toward said first shaft end of said valve shaft.

12. The exhaust gas control valve as set forth in claim 11, wherein said resilient shaft shield includes a first shield portion proximal to said second shaft end of said valve shaft and extending toward said first shaft end of said valve shaft, a second shield portion extending from said first shield portion away from said valve shaft, and a third shield portion extending from said second shield portion toward said second shaft end of said valve shaft.

13. An exhaust gas control assembly including said exhaust gas control valve as set forth in claim 1 and an actuator coupled to said housing of said exhaust gas control valve and configured to rotatably drive said pinion gear.

14. The exhaust gas control valve as set forth in claim 1, wherein said helical cam gear is rotatable in either a first rotational direction or a second rotational direction opposite said first rotational direction, wherein said motion converter includes a link coupled to said first shaft end of said valve shaft and a bearing rotatably supported by said link, and wherein said bearing is engageable with said cam feature of said helical cam gear to move said valve member toward said second valve position as said helical cam gear rotates in said first rotational direction.

15. The exhaust gas control valve as set forth in claim 14, wherein said bearing defines a bore, and wherein said motion converter further includes a bearing shaft rotatably supported by said link and disposed in said bore of said bearing.

16. The exhaust gas control valve as set forth in claim 15, wherein said helical cam gear has a return feature extending away from said helical cam gear surface and extending about said central opening, wherein said return feature is spaced between said cam feature and said plurality of helically arranged teeth, and wherein said bearing shaft includes an extended portion engageable with said return feature of said helical cam gear to move said valve member toward said first valve position as said helical cam gear rotates in said second rotational direction.

17. The exhaust gas control valve as set forth in claim 1, wherein said cam feature of said helical cam gear is configured to provide a non-linear cam ramp rate.

18. The exhaust gas control valve as set forth in claim 17, wherein said valve member is configured to move a distance from said first valve position to said second valve position, and wherein said cam feature of said helical cam gear is configured to provide said non-linear cam ramp rate such that mechanical advantage is maximized when said valve member is within 0 percent to 10 percent of said distance from said first valve position.

19. An assembly for controlling a flow of exhaust gas from an engine, said assembly comprising:

an exhaust gas manifold adapted to be coupled to the engine; and an exhaust gas control valve comprising, a housing having an interior wall defining a housing interior;

a pinion gear coupled to said housing and configured to be rotatably driven;

a helical gear configured to receive torque from said pinion gear, said helical gear including a plurality of helically arranged teeth;

a valve member disposed at least partially in said housing interior of said housing, said valve member comprising a valve shaft extending along an axis and having a first shaft end and a second shaft end spaced from said first shaft end along said axis, and a valve body coupled to said valve shaft adjacent to said second shaft end and moveable with said valve shaft along said axis between a first valve position and a second valve position to regulate the flow of exhaust gas; and a motion converter configured to convert rotational motion of said helical gear to linear motion of said valve member, wherein said helical gear is further defined as a helical cam gear having a helical cam gear surface defining a central opening therethrough and having a cam feature extending away from said helical cam gear surface and disposed about said central opening.

20. An exhaust gas control valve for regulating a flow of exhaust gas, said exhaust gas control valve comprising:

a housing having an interior wall defining a housing interior;

a pinion gear coupled to said housing and configured to be rotatably driven;

a helical gear configured to receive torque from said pinion gear, said helical gear including a plurality of helically arranged teeth;

a valve member disposed at least partially in said housing interior of said housing, said valve member comprising a valve shaft extending along an axis and having a first shaft end and a second shaft end spaced from said first shaft end along said axis, and a valve body coupled to said valve shaft adjacent to said second shaft end and moveable with said valve shaft along said axis between a first valve position of said valve member and a second valve position of said valve member to regulate the flow of exhaust gas;

a motion converter configured to convert rotational motion of said helical gear to linear motion of said valve member; and a shaft shield disposed about said valve shaft, wherein said shaft shield is further defined as a resilient shaft shield configured to resiliently engage said interior wall of said housing to limit the flow of exhaust gas toward said first shaft end of said valve shaft.

* * * * *